Dec. 16, 1958 V. J. McCARTHY ET AL 2,864,601
AUGER BORING HEAD WITH NON-ROTATING BARREL
Filed Aug. 6, 1956 5 Sheets-Sheet 1

INVENTORS
Vincent J. M<sup>c</sup>Carthy and
BY George L. Adams

Frease & Bishop
ATTORNEYS

Dec. 16, 1958 V. J. McCARTHY ET AL 2,864,601
AUGER BORING HEAD WITH NON-ROTATING BARREL
Filed Aug. 6, 1956 5 Sheets-Sheet 2

INVENTORS
Vincent J. M<sup>c</sup>Carthy and
BY George L. Adams

Frease & Bishop
ATTORNEYS

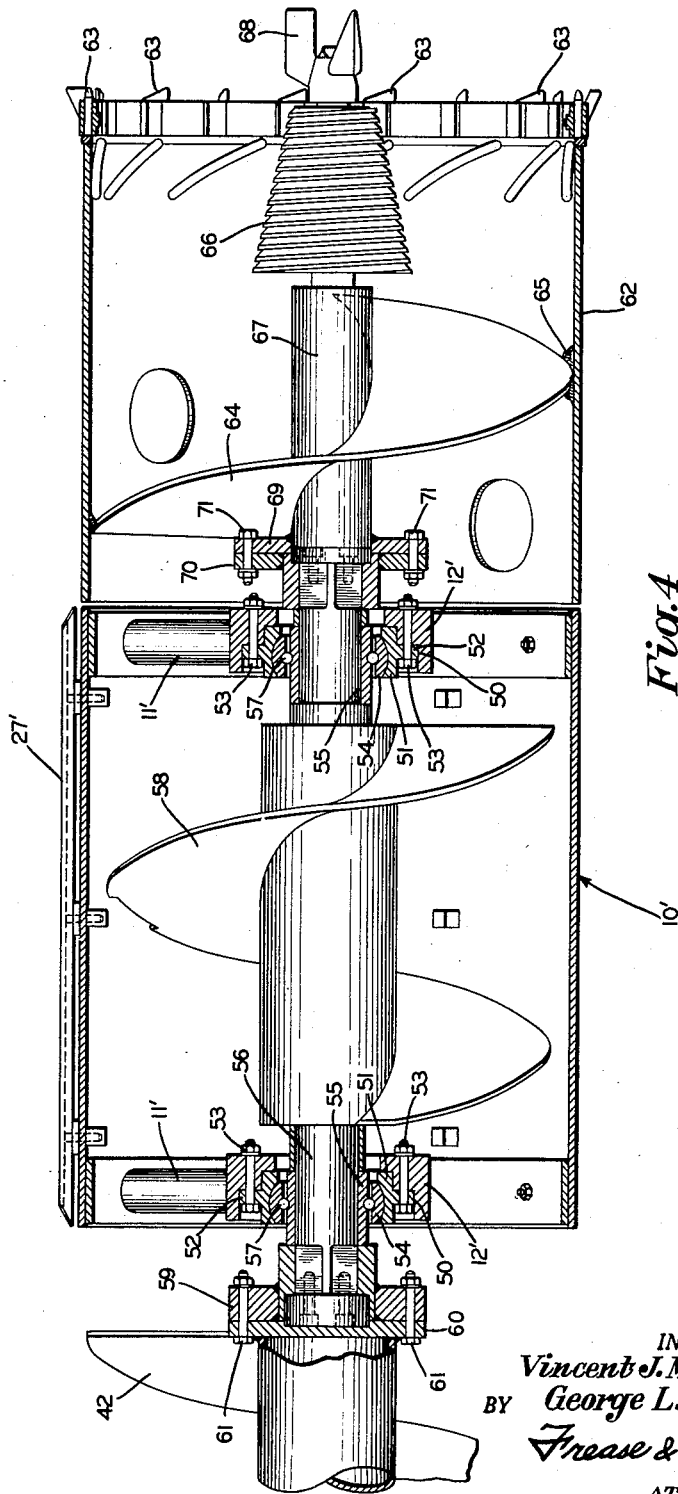

Dec. 16, 1958 V. J. McCARTHY ET AL 2,864,601
AUGER BORING HEAD WITH NON-ROTATING BARREL
Filed Aug. 6, 1956 5 Sheets-Sheet 4

INVENTORS
Vincent J. M<sup>c</sup>Carthy a
BY George L. Adams n d
Frease & Bishop
ATTORNEYS Dec. 16, 1958 V. J. McCARTHY ET AL 2,864,601
AUGER BORING HEAD WITH NON-ROTATING BARREL
Filed Aug. 6, 1956 5 Sheets-Sheet 5

INVENTORS
Vincent J. M<sup>c</sup>Carthy and
BY George L. Adams

Frease & Bishop
ATTORNEYS

United States Patent Office 2,864,601
Patented Dec. 16, 1958

2,864,601

AUGER BORING HEAD WITH NON-ROTATING BARREL

Vincent J. McCarthy, Youngstown, and George L. Adams, Salem, Ohio, assignors to The Salem Tool Company, Salem, Ohio, a corporation of Ohio Application August 6, 1956, Serial No. 602,357

4 Claims. (Cl. 262—26)

The invention relates to auger boring heads for coal mining machines, and more particularly to such a boring head having a non-rotating barrel surrounding a rotating auger and providing a guide to prevent the auger head from traveling downward, upward or laterally out of a straight line when boring into a coal seam.

Such boring heads as have been previously produced comprise generally a rotatable barrel having cutting bits at its forward end for cutting a cylindrical kerf in the coal seam, and a breaker within the forward end of the barrel for bursting the cylindrical core of coal thus cut, and auger means within the barrel and rotatable therewith for conveying the mined coal outwardly.

This general type of boring head is shown in Joy Patent No. 1,445,085 dated February 13, 1923, McCarthy et al. Patent No. 2,720,391 dated October 11, 1955 and McCarthy Patent No. 2,738,965 dated March 20, 1956.

In boring heads of this general type difficulty is sometimes experienced due to the tendency of the rotating barrel to travel downward, upward or laterally out of a straight line as it is advanced into the coal seam.

It is therefore an object of the present invention to provide an auger boring head including a non-rotating barrel adapted to guide the same in a straight line as it is bored into a coal seam or the like.

Another object is to provide a boring head of this type having longitudinally disposed runners attached to the exterior of the non-rotating barrel and adapted to guide the barrel in a straight line through the cylindrical opening cut into the coal seam.

Still another object is to provide such a boring head in which the non-rotating barrel has a hub therein through which is journalled a rotatable shaft having auger means thereon and cutting means at its forward end.

A further object is to provide a boring head of the character referred to in which the runners are eccentric to the rotatable shaft.

A still further object is to provide a boring head of this type in which the eccentricity of the runners to the shaft may be provided by placing shims of varying thickness between the runners and the periphery of the non-rotating barrel.

Another object is to provide such a boring head in which the rotary shaft is journalled in bearings eccentric to the non-rotating barrel.

A further object is to provide such a non-rotating barrel in combination with a rotating barrel having cutting means and breaker means therein.

A still further object is to provide a boring head in which the runners are connected directly to the spokes or arms of a non-rotating spider within which the rotary shaft is journalled.

Another object of the invention is to provide a boring head of this type in which the runners are located eccentric to the rotary shaft by means of shims of various thickness located between the runners and the spokes or arms of the spider.

The above objects together with others which will be apparent from the drawings and following description, of which may be later referred to, may be attained by constructing the improved auger boring head in the manner hereinafter described in detail and illustrated in the accompanying drawings.

In general terms the invention may be described briefly as comprising a non-rotating barrel having longitudinally disposed runners attached to the periphery thereof and having a hub therein through which is journalled a shaft having auger means thereon and cutting means attached to the forward end of the shaft providing a slack head for mining coal.

The runners are located eccentric to the rotary shaft. This eccentric location of the runners may be provided by placing shims of various thickness between the runners and the non-rotating barrel.

In one embodiment of the invention the eccentric location of the runners may be provided by journalling the rotary shaft in eccentric bearings within the non-rotating barrel.

In another embodiment of the invention the non-rotating barrel may be dispensed with and the runners may be attached directly to the spokes or arms of a spider through which the rotary shaft is journalled. The runners are located eccentric to the rotary shaft in either manner as above stated.

Shims of various thickness may be located between the runners and the ends of the spokes or arms of the spider.

By locating the runners eccentric to the rotary shaft, they will thus be eccentric to the hole bored by the boring head, and when the runners enter the hole they will tend to force the head to one side. The head may thus be guided in the desired direction by axially adjusting the positions of the eccentric runners around the rotary shaft.

Where it is desired to mine lump coal, the rotatable shaft within the non-rotating barrel may have a conventional rotatable barrel attached at its forward end with cutting means at the forward end thereof, central breaker means therein and an auger flight rotatable therewith.

Having thus briefly described the invention, reference is now made to the accompanying drawings showing preferred embodiments thereof, in which;

Fig. 4 is a longitudinal sectional view through a mining head for mining lump coal in which the non-rotating barrel is combined with a rotating barrel;

Figure 1:
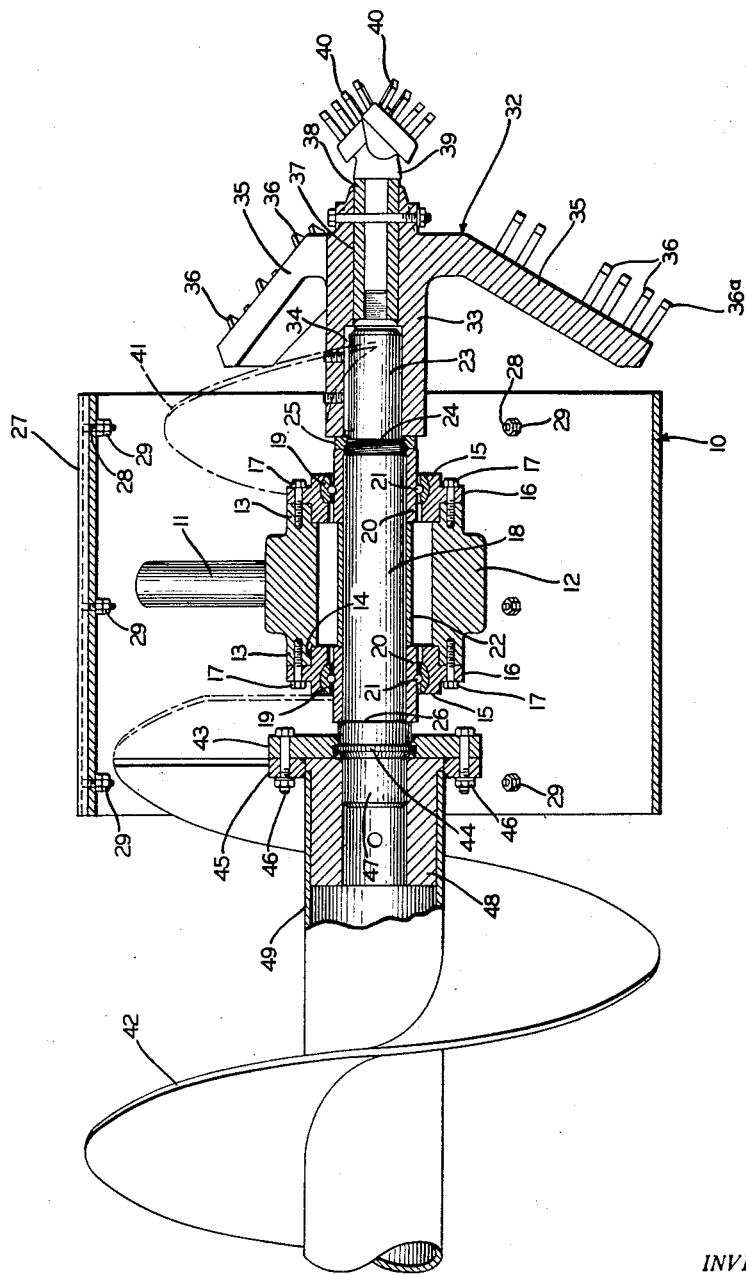
Fig. 1 is a longitudinal sectional view through an auger mining head with non-rotating barrel, for mining slack coal.
Figure 2:
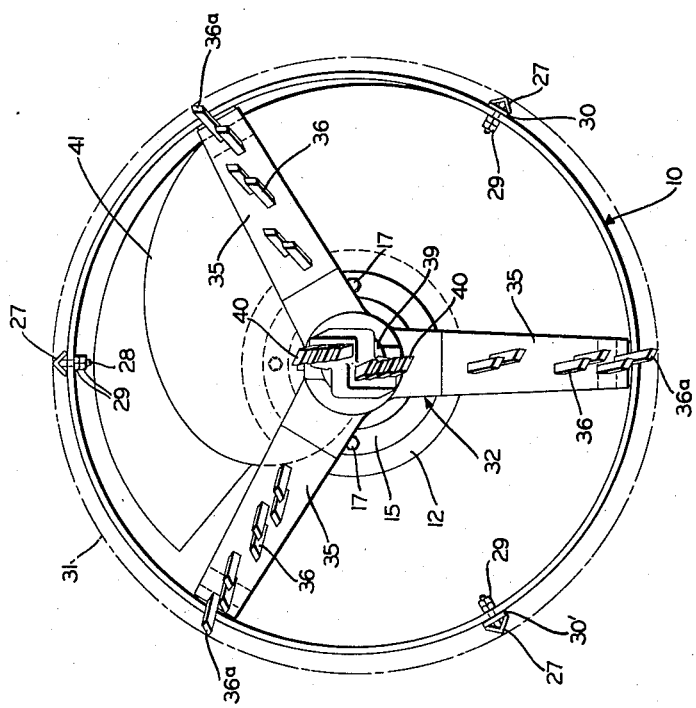
Fig. 2 is a front elevation of the mining head shown in Fig. 1.
Figure 3:
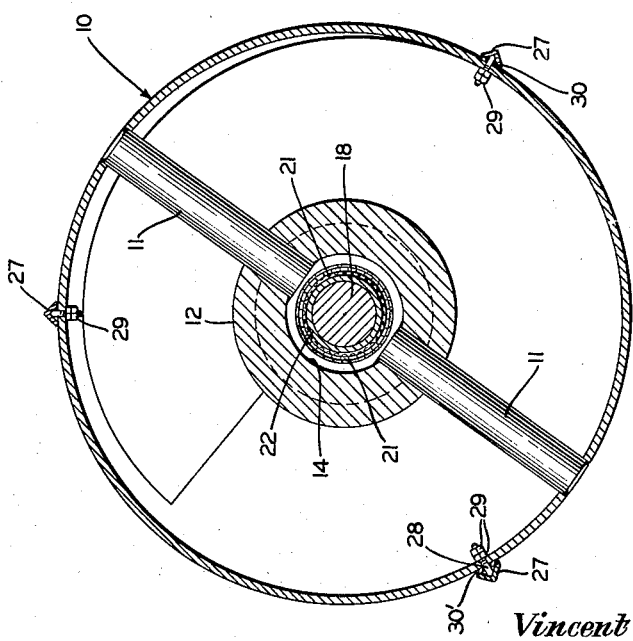
Fig. 3 is a transverse sectional view through the mining head shown in Fig. 1.

Referring first to the form of the invention illustrated in Figs. 1 to 3, the non-rotating cylindrical barrel is indicated generally at 10 and has fixed thereon a pair of spokes 11 attached to the centrally located hub 12.

Opposite ends of the hub 12 are reduced in diameter as indicated at 13 and may be internally recessed as at 14 to receive the bearing rings 15, each of which has a peripheral flange 16 abutting the end of the adjacent reduced portion 13 of the hub and attached thereto as by screws 17.

The shaft 18 is journalled through the hub 12, and for the purpose of providing non-friction bearings, an outer ball race 19 may be fixed within each bearing ring 15, and inner ball races 20 may be fixed upon the shaft to receive the balls 21 of the ball bearings. A spacer sleeve 22 is located through the central portion of the hub 12 between the inner bearing races 20.

The forward end of the shaft 18 may be reduced in diameter, as indicated at 23, with a screw-threaded portion 24 which receives a nut 25 for engaging the adjacent inner ball race 20 and clamping the two inner ball races and interposed spacer sleeve 22 between said nut and the shoulder 26 upon the rear portion of the shaft.

Longitudinally disposed runners 27 are provided at spaced points around the periphery of the barrel 10, each of these runners having screw portions 28 located through suitable apertures in the barrel, nuts 29 being mounted thereon for securing the runners upon the barrel.

Shims of various thickness may be mounted between the runners and the periphery of the barrel for eccentrically positioning the runners relative to the rotary shaft 18.

As shown in Figs. 2 and 3, a shim 30, which may be approximately ⅛" thick, is located beneath the runner 27 at the lower right side of the barrel, a shim 30', of approximately ¼" thickness is located beneath the runner at the lower left side of the barrel, and no shim is located beneath the runner at the top of the barrel.

The runners 27 will thus be located eccentric to the rotary shaft 18, and will therefore be eccentric to the hole bored into the coal seam, as indicated by the broken line circle 31 in Fig. 2, so that two of the runners will bear against the bore, as shown in said figure, and will tend to force the head to one side or the other as desired.

By adjusting the positions of the runners 27 axially around the shaft 18, the head may thus be forced in any desired direction, upward, downward or laterally, as may be required in order to guide it in a straight line as it is bored into the coal seam, and overcome the natural tendency of the head to drift laterally or vertically, as it is bored into the coal seam.

As shown in Figs. 1 and 2, a cutting tool indicated generally at 32 is attached to the reduced forward end 23 of the shaft 18. The cutting tool is provided with the tubular shank 33 which may be keyed upon the reduced portion 23 of the shaft as indicated at 34.

This cutting tool comprises generally a plurality of radially disposed, rearwardly inclined arms 35, each having a plurality of cutting bits 36 mounted thereon, the outermost bit extending beyond the periphery of the barrel 10, as indicated at 36a in Figs. 1 and 2, so as to cut a cylindrical opening in the coal seam of slightly greater diameter than the barrel 10, as indicated by the broken line 31 in Fig. 2.

A centrally located socket 37 is formed in the forward end of the cutting tool 32 to receive the shank 38 of the central cutting member 39 having a plurality of cutting bits 40 thereon. An auger flight 41 is attached to the tubular shank or hub 33 of the head and surrounds the shaft 18, within the non-rotating barrel 10, and is adapted to be rotated therewith to immediately move the coal rearwardly from the cutting tool or head 32.

The coal moved rearwardly by the auger flight 41 travels back through the barrel and is again picked up by the forward end of the conveyor or auger section 42 which is approximately the same diameter as the flight 41.

For the purpose of attaching the conventional auger section 42 to the rear end of the shaft 18, a flange 43 may be welded or otherwise fixed to the shouldered portion 44 of the shaft. A flange ring 45 may be welded or otherwise attached to the adjacent end of the auger section 42, for connection to the flange 43 as by bolts 46.

The rearwardly disposed shank 47 of the shaft 18 may be received within the socket 48 at the forward end of the tubular shaft 49 of the auger section.

With the construction shown in Figs. 1 to 3 and above described, slack coal may be mined by boring the improved mining head into a coal seam, rotating the auger section 43 in usual manner to cause similar rotation of the shaft 18 and cutting tool 32.

This cutting tool being rotated as it is advanced into the face of the coal seam cuts a cylindrical opening therein of slightly greater diameter than the non-rotating barrel 10. This barrel is advanced into the opening thus bored into the coal seam, the runners 27 thereon eccentrically engaging in the walls of the cylindrical opening in the coal seam, as indicated in Fig. 2, preventing rotation of the barrel 10 and forcing it to either side as may be required for guiding the mining assembly in a straight line into the coal seam, preventing it from drifting upward, downward or laterally in either direction.

The barrel 10 may be turned so as to locate the runners 27 at any desired points around the same in order to properly guide the mining head as it bores into the coal seam.

As shown in Fig. 4, a non-rotating barrel, indicated generally at 10', may have a support formed at each end thereof instead of a single support at the center as shown in Fig. 1. For this purpose, the diametric spokes or arms 11' are connected within each end portion of the barrel, each pair of spokes being centrally connected to a hub portion 12'.

Each hub 12' is internally recessed as indicated at 50 to receive a bearing ring 51, the peripheral flange 52 of which may be attached to the hub 12' as by bolts 53. An outer ball race 54 is mounted in each bearing ring 51 and cooperates with an inner ball race 55, upon the shaft 56, to accommodate the bearing balls 57.

An auger flight 58 is fixed upon the shaft 56 intermediate the spiders so as to rotate with the shaft within the non-rotating barrel.

Runners 27', similar to the runners 27 of Figs. 1 to 3, may be attached to the exterior of the barrel 10' in the manner above described. For the purpose of attaching a conventional auger section 52 to the rear end of the shaft 56, a flange 59 may be welded or otherwise attached to the rear end of the shaft for connection to the flange 60 of the auger section as by bolts 61.

If it is desired to mine slack coal, a cutting tool as shown in Figs. 1 and 2 may be attached to the forward end of the shaft 56. However, if it is desired to mine lump coal, a conventional rotating barrel boring head may be attached to the forward end of the shaft 56.

As shown in Fig. 4 a boring head with breaker, of the type shown in the above-mentioned McCarthy Patent No. 2,738,965, is attached to the forward end of the shaft 56. This conventional boring head comprises the rotatable barrel 62 having the peripheral cutting bits 63 at its forward end, an auger flight 64 welded within the barrel as indicated at 65 and the breaker device 66 at the forward end of the auger shaft 67 provided with central cutting tool 68. The rear end of the auger shaft 67 may be provided with flange 69 attached to the flange 70 of the shaft 56 as by bolts 71.

With the structure shown in Fig. 4, as the auger section 42 is revolved in conventional manner, the shaft 56 with auger flight 58, within the non-rotating barrel 10', will be rotated to rotate the rotatable barrel 62 in the manner illustrated and described in detail in said McCarthy patent above referred to.

As large lumps of coal are thus mined by the rotating barrel auger head they will be carried rearwardly therethrough by the auger flight 64, and through the non-rotating barrel 10' by the auger flight 58 and into the conventional auger section 42.

The runners 27' will eccentrically engage in the cylindrical opening cut into the coal seam, in the manner above described, guiding the mining assembly in a straight line into the coal seam preventing upward, downward or lateral drifting thereof.

Figure 6:
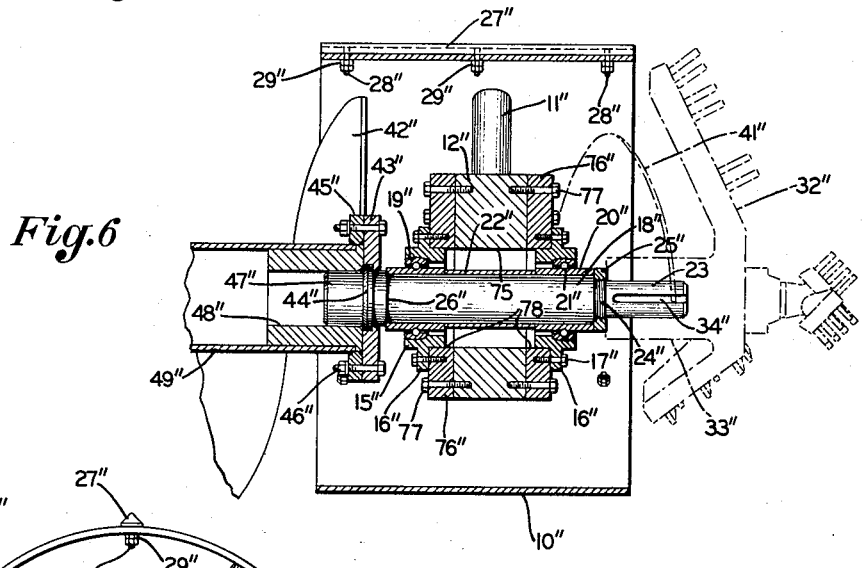
Fig. 6 is a longitudinal sectional view of the non-rotating barrel shown in Fig. 5.
Figure 5:
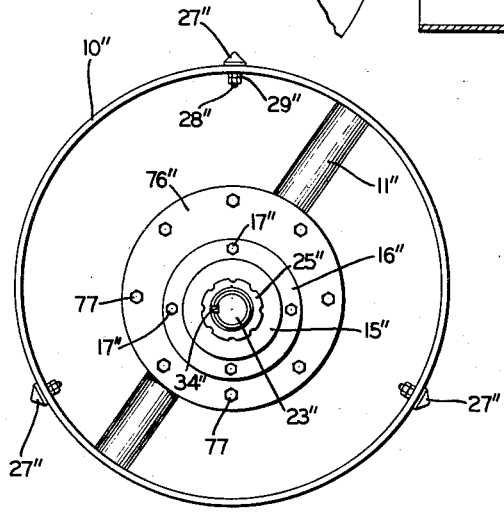
Fig. 5 is an end elevation of a non-rotating barrel having eccentric bearings for the rotary shaft.

Referring now to the construction illustrated in Figs. 5 and 6, in this embodiment of the invention the non-rotating barrel 10" may be substantially the same as the barrel 10 shown in Fig. 1, with means for eccentrically journalling the shaft 18" therein so that the runners will be located eccentrically to the axis of the shaft.

The non-rotating cylindrical barrel 10" has fixed therein a pair of spokes or arms 11" attached to the centrally located hub 12". The hub is eccentrically bored as indicated at 75.

Bearing plates 76" are detachably connected to opposite sides of the hub as by the cap screws 77. Each of the bearing plates 76 is eccentrically bored as at 78 to receive the bearing rings 15", the peripheral flanges 16" of which abut the outer sides of the bearing plates 76 and are attached thereto as by the cap screws 17".

The shaft 18" is journalled through the bearing rings 15", preferably by means of non-friction bearings. For this purpose an outer ball race 19" may be fixed within each bearing ring 15" and inner ball races 20" may be fixed upon the shaft to receive the balls 21" of the ball bearings. A spacer sleeve 22" is located through the bore of the hub between the inner bearing races 20".

The forward end of the shaft 18" may be reduced, as indicated at 23", and screw threaded as at 24" to receive the nut 25" for engaging the adjacent inner ball race 20" and clamping the inner ball races and interposed spacer sleeves 22" between said nut and the shoulder 26" upon the rear portion of the shaft.

Longitudinally disposed runners 27" are provided at spaced points around the periphery of the barrel 10", each runner having screw portions 28" located through suitable apertures in the barrel, nuts 29" being mounted thereon for securing the runners upon the barrel.

In this form of the invention it is not necessary that shims of varying thickness be mounted between the runners 27 and the periphery of the barrel since the eccentric mounting of the shaft 18 within the hub of the spider will provide for locating the runners eccentrically to the axis of the shaft. If any shims are used between the runners and the periphery of the barrel they may all be of the same thickness.

As indicated in broken lines in Fig. 6, a cutting tool 32" of the type shown in Fig. 1, may be attached to the reduced forward end 23" of the shaft. The cutting tool is provided with tubular shank 33" which may be keyed upon the reduced portion of the shaft as indicated at 34".

It should be understood that where it is desired to mine lump coal rather than slack coal, instead of attaching the cutting tool 32" to the forward end of the shaft, a rotary cutting head such as shown in Fig. 4 may be attached to the shaft.

An auger flight 41" is attached to the hub 33" of the cutting head 32" and surrounds the shaft 18" within the non-rotating barrel and is adapted to be rotated therewith, within the non-rotating barrel, to immediately move the coal rearwardly from the head in the manner described in connection with Fig. 1.

Conventional auger sections 42" may be attached to the rear end of the shaft 18" as by the flange 43" welded or otherwise fixed to the shouldered portion 44" of the shaft. A flange ring 45" may be welded or otherwise attached to the adjacent end of the auger section 42" for connection to the flange 43" as by bolts 46". The rearwardly disposed shank 47" of the shank 18" may be received within the socket 48" at the forward end of the tubular shaft 49" of the auger section.

With this construction, by removing the cap screws 77 and turning the bearing plates 76" relative to the hub 12", any desired fitting can be obtained with desired degree of eccentricity of the runners 27" to the axis of the shaft 18".

Figure 7:
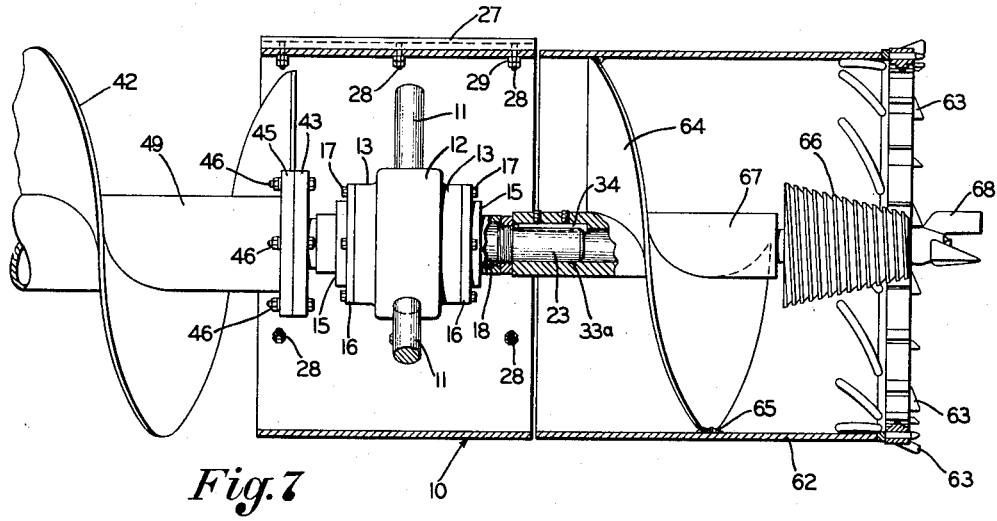
Fig. 7 is a longitudinal sectional view of a non-rotating barrel of the type shown in Fig. 1, combined with a rotating barrel for mining lump coal.

As shown in Fig. 7, a non-rotating barrel of the type shown in Fig. 1 may have a rotating barrel boring head of the type shown in Fig. 4, attached to the forward end of the shaft, for the purpose of mining lump coal. For this purpose the non-rotating barrel 10 may be of the same construction as shown in Fig. 1, and the same reference numerals are applied to corresponding parts thereof.

The rotary barrel boring head may be of the same construction as shown in Fig. 4, and the same reference numerals are applied thereto. For the purpose of attaching the rotary barrel boring head to the non-rotating barrel, the auger shaft 67 may be provided at its rear end with a socket 33a adapted to receive the reduced forward end 23 of the shaft 18 and to be connected thereto as by key-way 34a. Otherwise the parts are as illustrated and described above.

Figure 9:
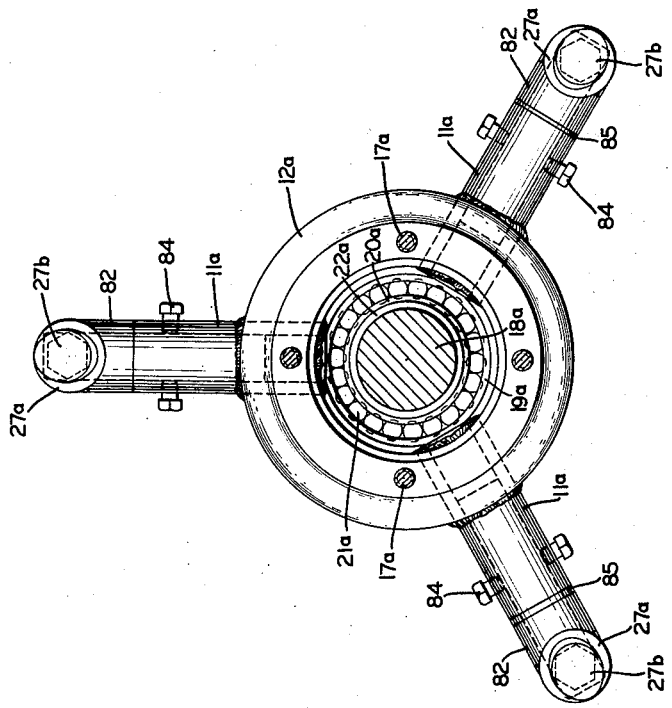
Figure 8:
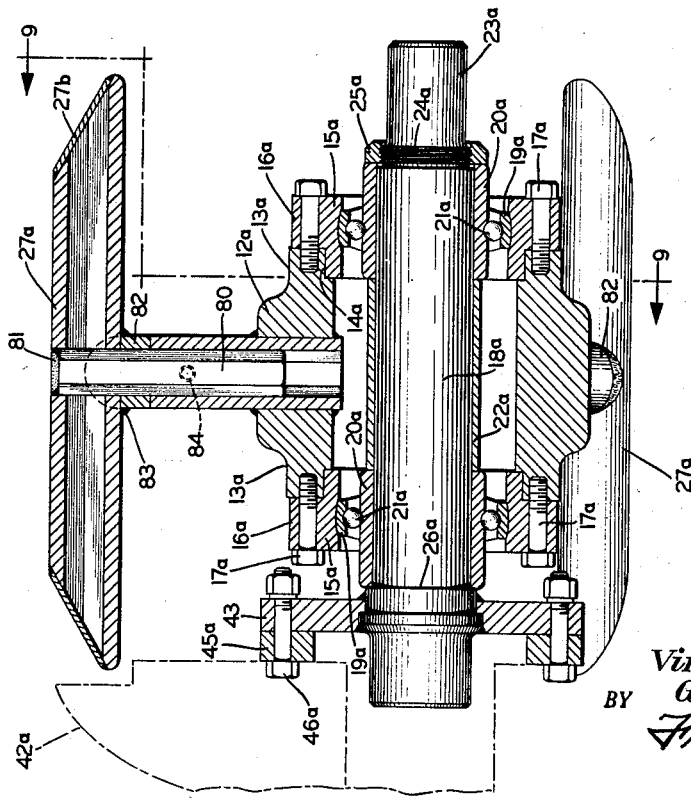
Fig. 8 is a longitudinal sectional view of a non-rotating spider with runners thereon for guiding a boring head; and, Fig. 9 is a transverse section taken as on the line 9—9, Fig. 8.

In Figs. 8 and 9 is shown an embodiment of the invention in which the runners are attached directly to the spokes or arms of a spider, and the non-rotating barrel is omitted. In this embodiment of the invention the spokes 11a of the spider are tubular and preferably of hexagonal cross-section. These spokes are welded to the hub 12a.

Opposite ends of the hub are shown as reduced in diameter, as indicated at 13a, and internally recessed, as at 14a, to receive the bearing rings 15a, each of which has a peripheral flange 16a abutting the adjacent end of the hub and attached thereto as by cap screws 17a.

The shaft 18a is journalled through the hub, and non-friction bearings are provided comprising the outer ball races 19a fixed within the bearing rings 15a, and the inner ball races 20a fixed upon the shaft to receive the balls 21a of the ball bearings. A spacer sleeve 22a is located around the shaft between the inner bearing races 20a.

A reduced forward end 23a is provided upon the shaft with a screw-threaded portion 24a to receive the nut 25a which engages the adjacent inner ball race 20a for clamping the two ball races and interposed spacer sleeve 22a against the shoulder 26a at the rear portion of the shaft.

The runners 27a are adapted to be connected directly to the outer ends of the spokes or arms 11a of the spider. These runners may be formed of tubing with the ends bevelled and closed by plates 27b welded thereto as shown in Fig. 8.

A hexagonal bar 80 is located perpendicular through the middle portion of each runner 27a, being welded thereto as at 81. A short section of tubing 82, of a cross-sectional size and shape corresponding to the tubular spokes 11a, is located around the hexagonal bar 80, adjacent the junction thereof with the runner, and is welded to the runner as at 83. To attach the runners to the spokes 11a, the hexagonal bars 80 are inserted into the tubular spokes 11a and fixed as by the set screws 84.

For the purpose of locating the runners 27a eccentric to the axis of the shaft 18a, shims as indicated at 85, in the form of rings, are located around the hexagonal bar 80 between the opposed ends of the spokes 11a and tubing 82.

It will of course be understood that the shims should vary in thickness so as to locate the runners 27a eccentric to the axis of the shaft in the same manner that the runners 27 are located eccentric to the axis of the shaft in the embodiment of the invention illustrated in Figs. 1 to 3.

A cutting tool such as shown at 32 in Figs. 1 and 2, may be attached to the reduced forward end 23a of the shaft for cutting slack coal, or a rotary barrel cutting head such as shown in Figs. 4 and 7 may be attached thereto if it is desired to mine lump coal.

An auger section 42a may be attached to the flange 43a at the rear end of the shaft 18a as by the flange ring 45a and bolts 46a. In this embodiment of the invention the spider will be non-rotating and the eccentrically mounted runners will guide the boring head in the manner described in detail above.

In the foregoing description, certain terms have been used for brevity, clearness and understanding but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. A rotatable and advanceable auger boring head structure comprising a rotatable shaft, cutting means rigidly connected to the forward end of the shaft for cutting into a body of material to be mined and removing material from said body to form a bore in said body, a hub journalled upon said shaft and freely rotatable in either direction relative to the shaft, a maximum of two radial spokes upon said hub, a barrel carried by said spokes, said barrel being of slightly less diameter than said cutting means, an auger flight upon the shaft for conveying rearwardly material removed by said cutting means, and longitudinal substantially V-shape runners upon said barrel for engaging in the bore in said body of material and preventing rotation of said barrel.

2. A rotatable and advanceable auger boring head structure as defined in claim 1, in which the runners are located eccentrically to the axis of the shaft.

3. A rotatable and advanceable auger boring head structure as defined in claim 1, in which the barrel is mounted eccentrically of the shaft.

4. A rotatable and advanceable auger boring head structure comprising a rotatable shaft, cutting means rigidly connected to the forward end of the shaft for cutting into a body of material to be mined and removing material from said body to form a bore in said body, spaced bearing rings journalled upon the shaft, eccentric bearing plates attached to the bearing rings, an eccentric hub located between and detachably connected to the bearing rings, radial spokes upon said hub, a barrel carried by said spokes, said barrel being of slightly less diameter than said cutting means, an auger flight upon the shaft and conveying rearwardly material removed by said cutting means, and longitudinal runners upon said barrel for engaging in the bore in said body of material and preventing rotation of said barrel.

References Cited in the file of this patent

UNITED STATES PATENTS

| | | |
|---|---|---|
| 1,721,004 | Debose | July 16, 1929 |
| 2,072,320 | Thomas | Mar. 2, 1937 |
| 2,177,300 | Kellegrew | Oct. 24, 1939 |
| 2,316,409 | Downing | Apr. 13, 1943 |
| 2,647,726 | Kirk | Aug. 4, 1953 |
| 2,696,367 | Robishaw | Dec. 7, 1954 |
| 2,712,434 | Giles et al. | July 5, 1955 |
| 2,715,526 | Letts | Aug. 16, 1955 |
| 2,751,203 | Compton | June 19, 1956 |